(12) United States Patent
Tetreault

(10) Patent No.: US 9,667,731 B2
(45) Date of Patent: May 30, 2017

(54) SYSTEMS AND METHOD FOR DISPLAYING AND CATEGORIZING NEWS FEED POSTS

(76) Inventor: Ginger Tetreault, Winnipeg (CA)

( * ) Notice: Subject to any disclaimer, the term of this patent is extended or adjusted under 35 U.S.C. 154(b) by 104 days.

(21) Appl. No.: 13/980,157

(22) PCT Filed: Jan. 23, 2012

(86) PCT No.: PCT/CA2012/050036
§ 371 (c)(1),
(2), (4) Date: Jul. 17, 2013

(87) PCT Pub. No.: WO2012/097458
PCT Pub. Date: Jul. 26, 2012

(65) Prior Publication Data
US 2013/0304822 A1 Nov. 14, 2013

Related U.S. Application Data

(60) Provisional application No. 61/435,026, filed on Jan. 21, 2011.

(51) Int. Cl.
| | |
|---|---|
| *G06F 3/048* | (2013.01) |
| *H04L 29/08* | (2006.01) |
| *H04N 21/2187* | (2011.01) |
| *H04N 21/258* | (2011.01) |
| *H04N 21/4788* | (2011.01) |
| *H04N 21/84* | (2011.01) |

(52) U.S. Cl.
CPC ......... *H04L 67/22* (2013.01); *H04N 21/2187* (2013.01); *H04N 21/25883* (2013.01); *H04N 21/4788* (2013.01); *H04N 21/84* (2013.01)

(58) Field of Classification Search
CPC ........... G06F 17/30867; G06F 17/3089; G06F 17/30905; G06F 17/30705; G06F 17/30994; G06F 17/30761; G06F 17/30893; G06F 17/30991; G06F 3/048; G06Q 50/01
See application file for complete search history.

(56) References Cited

U.S. PATENT DOCUMENTS

| | | | |
|---|---|---|---|
| 2007/0226640 A1* | 9/2007 | Holbrook et al. | 715/765 |
| 2008/0178230 A1* | 7/2008 | Eyal | H04N 21/8153 725/86 |
| 2009/0254510 A1* | 10/2009 | Omoigui | 706/55 |

(Continued)

*Primary Examiner* — Arvin Eskandarnia
*Assistant Examiner* — Matthew Ballard
(74) *Attorney, Agent, or Firm* — Kyle R. Satterthwaite; Ryan W. Dupuis; Ade & Company Inc.

(57) ABSTRACT

Categorizing, colorizing, saving and visually filtering the content and appearance, of a live news feed, within a business or social network. The method involves categorizing information, photos, video and the like, prior to posting it within the live news feed. Each category is associated with a visual indicator so that postings of different categories become distinctive. The live news feed can be viewed in its entirety, by user type, by subject category or a combination of categories. The viewing user may choose categories for limiting information which appears in the live news feed by subject or user type, but may also have the option of viewing all content, which can be visually filtered by color. Users may save information from the central live news feed to their personal pages by choosing from the variety of categories that are also used to filter the live news feed content viewable to them.

24 Claims, 8 Drawing Sheets

(56) References Cited

U.S. PATENT DOCUMENTS

| | | | | |
|---|---|---|---|---|
| 2010/0131895 | A1* | 5/2010 | Wohlert | H04L 65/604 |
| | | | | 715/811 |
| 2011/0113057 | A1* | 5/2011 | Lee et al. | 707/769 |
| 2011/0137894 | A1* | 6/2011 | Narayanan et al. | 707/723 |
| 2011/0307695 | A1* | 12/2011 | Slater | 713/163 |
| 2012/0059820 | A1* | 3/2012 | Lakshmanan et al. | 707/723 |

* cited by examiner

FIG. 5      Live Feed Process With Steps to Categorize
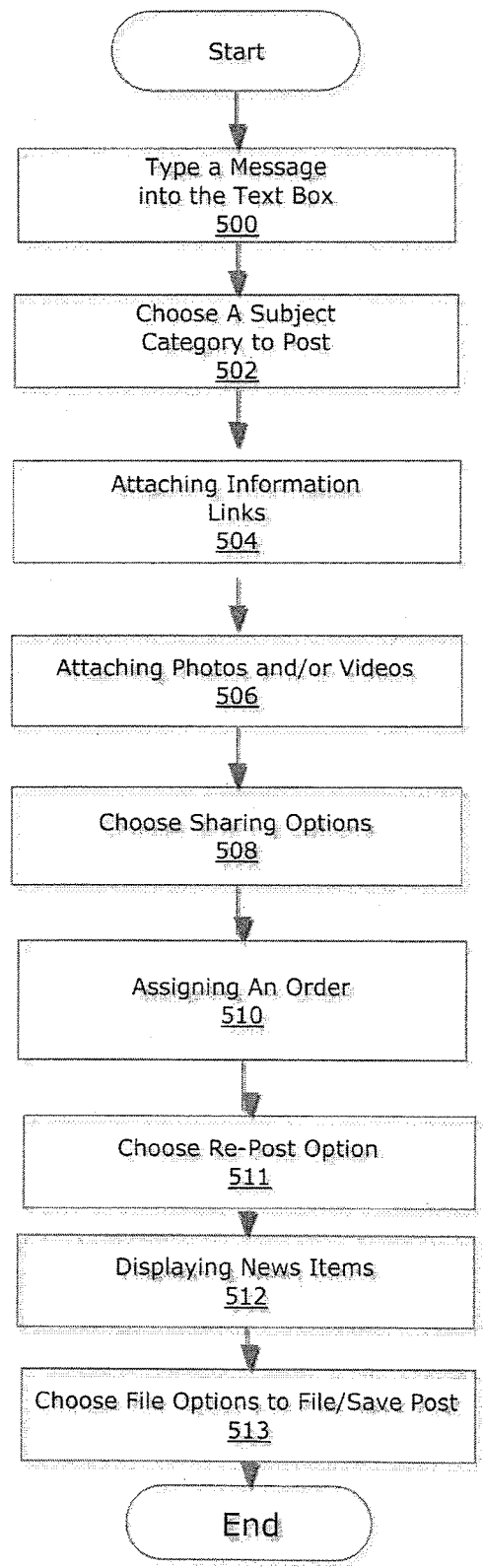

SYSTEMS AND METHOD FOR DISPLAYING AND CATEGORIZING NEWS FEED POSTS

This application is the national stage of PCT/CA2012/050036, filed Jan. 23, 2012, and claims benefit under 25 U.S.C. 119(e) of U.S. Provisional Application Ser. No. 61/435,026, filed Jan. 21, 2011

BACKGROUND OF THE INVENTION

Field of the Invention

The present invention relates generally to the categorization of information before it is entered or posted into either a central live news feed or a personal live news feed, wherein each category is represented by a pre-determined color or other indicator and a viewing user can choose to file/store information from a post of interest for later reference independently of the news feed. The vibrant result is live information presentation within a live news feed that is colorized or labeled and may be filtered by selection of a category or multiple categories, making it possible for the user to visually filter the remaining posts to the live news feed by color. The categories of information may further be filtered by the viewing user who may choose to view all posts or choose to reduce displayed posts by selecting a user type and/or by subject type, from a predetermined category option list. The result is live information presentation within a colorized live news feed which filters out all remaining subjects and/or users the viewing user has not chosen to view.

Description of Related Art

Conventionally a user of a live news feed receives live news feed notifications of the activities of others who are indicated as friends, within the same social network. The user's friends are a list of people the user has added to their friend list from within the same social network. The user and their social media friends each have access to the live news feed of each other, if their privacy settings are set to allow access, and so each receives notifications of the others' activities. Their live news feed will also contain updates of information containing links to articles they wish to share, photos, videos and typewritten comments. The live newsfeed content may also consist of updates from various organizations, media and groups the user has chosen to follow. The live news feed is often a single color, or no color, with black text on a white background.

Not Long after social media began using a live news feed, they empowered the subject users with the ability to eliminate posts from their live feed view of a particular friend or group by selecting a 'remove' button on any post from that individual or group. They also have the option to reverse this change at any time.

User's within social media sites can also visit the social media page of a friend or group if they wish to see the activities of that individual, however the subject user has the ability to place limitations on the view each of their friends has of their personal social media page content, which includes their live news feed. Users outside of the subject user's friend list cannot view the subject user's social media page unless the subject user has set their security settings accordingly, enabling users who are not friends to see their personal live news feed, which is uncommon.

SUMMARY OF THE INVENTION

According to one aspect of the invention there is provided a method for categorizing, and displaying news feed content in color, within a business or social network environment, the method comprising:

receiving news feed posts associated with respective subject users, each news feed post having been assigned a category generating a central news feed containing the received news feed posts;

providing viewing access to the central news feed;

receiving central news feed viewing preferences from each viewer of the central news feed; and based on said news feed viewing preferences of each viewer, determining which of the news feed posts of said central news feed should be displayed to said viewer based on the category associated with each news feed post; and displaying to said viewer only the news feed posts of said central news feed that were not filtered out based on the viewing preferences of said viewer, wherein each different category is associated with a different respective color and each news feed post displayed to said viewer is accordingly displayed in the respective color associated with the category of said news feed post.

The category assigned to each news feed post may be a subject matter category corresponding to content of said news feed post, where each subject matter category is associated with a respective color, and the step of displaying the news feed posts comprises reproducing each displayed news feed post with the respective color according to the subject category of said displayed new feed post.

Alternatively, the category assigned to each news feed post may be a user-type category into which the subject user from whom said news feed post was received has been classified.

The user-type categories may include categories relating to one or more of languages spoken by the subject users, geographical locations in which the subject users reside, occupational positions occupied by the subject users, educational backgrounds of the subject users, and areas of expertise of the subject users.

The displaying step may comprise displaying a background or text of each displayed news post in the respective color, or outlining a display area of each displayed news post in the respective color. It will be appreciated however the other ways of displaying color in association with a news feed post are contemplated and within the scope of the present invention. Another example may involve placement of a square, circle, dot, character or other visual marker of any shape in a corner of a text-containing area of the post.

The feed viewing preferences of at least one viewer may include information on one or more categories to be filtered out from the news feed posts to be displayed to said viewer, or information on one or more categories to be included in the news feed posts to be displayed to said viewer.

The method may additionally include receiving responses from viewers to news feed posts viewed thereby, and updating the central news feed with said responses.

The step of receiving the responses and updating the central news feed may involve adding a user-selected message to the central news feed that is in response to a particular news feed posting viewed by a viewer and that is based on a pre-defined response option selected by said viewer.

The step of receiving the responses and updating the central news feed may involve adding a user-generated message to the central news feed that is in response to a particular news feed posting viewed by a viewer.

The user-selected or user-generated message is preferably shown in association with the particular news feed post The method may include providing each user with a respective personal news feed that is populated, at least in part, based on actions taken by users on the central news feed.

The personal news feed of each user may be viewable by other users.

A news feed post contributed to the central news feed by one of the subject users may trigger a corresponding post to said subject user's personal news feed.

A response message posted to the central news feed by one of the viewer's in response to a particular subject user's news feed post may trigger the posting of a corresponding post to said subject user's personal news feed.

The response message may also triggers the posting of another corresponding post to said viewer's personal news feed.

The method may include allowing the viewer to share one of the news feed posts with another party, which triggers the posting of a corresponding post to said viewer's personal news feed.

The step of displaying the news feed posts of said central news feed may comprise presenting an option to each viewer to save or file a copy of any displayed news feed post to another location associated with said viewer.

The other location may be said viewer's personal news feed, or a personal web page associated with said viewer within the network environment. In another embodiment, each user's personal news feed is viewable on said user's personal web page, and the other location is separate from said personal news feed.

Displaying each user's personal news feed may comprise presenting an option to save a copy of any visible posting in said personal news feed to the other location.

The method may additionally include presenting each user with privacy options concerning viewing of content of said user's personal news feed by the other users.

The step of receiving news feed posts from respective subject users may comprise, for at least one news feed post, receiving instructions to automatically re-post said news feed post to the central news feed at a later date or time.

According to a second aspect of the invention, there is provided a non-transitory computer readable medium having embodied thereon a program, the program being executable by a processor for performing the method of the first aspect of the invention.

According to a third aspect of the invention there is provided a method for reviewing categorized and colorized news feed content within a business or social network environment, the method comprising:

gaining access to a business or social network having a central news feed that contains news feed posts from subject users of the business or social network, each news feed post having been assigned a category;

submitting central news feed viewing preferences for use in determining which of the news feed posts of said central news feed should be displayed based on the category associated with each news feed post; and viewing a filtered display of the central news feed that contains only news feed posts of said central news feed that were not filtered out based on the viewing preferences, wherein each different category is associated with a different respective color and each news feed post of the filtered display is accordingly viewed in the respective color associated with the category of said news feed post.

According to another aspect of the invention, there is provided a method for categorizing and displaying live news feed content, within a business or social network, before it is shared and after it is shared, whereby the content is a colorized live news feed categorized by color, which may also be visually filtered. The subject user places the information into a category or multiple categories before it is shared. This may include a basic message consisting of text and an attached video link, photos, and the like. Once posted within the live news feed the information is now attached to a category and that particular category is associated with a color. The method further includes options available to the viewer to view the live news feed in its entirety, choose only the categories they wish to view or they may view all posts to the live news feed and filter the content visually by color. The viewer also has the option to shut off the color and filter live news feed content by using the category filters. There are no existing methods which limit a viewer's access to the central live news feed.

According to yet another aspect of the invention, there is provided a method for providing convenient repeat access in a business or social network to information associated with a news feed post after an initial viewing of said news feed post by a viewer, the method comprising:

receiving news feed posts associated with respective subject users;

generating a news feed containing the received news feed posts;

providing viewing access to the news feed by the viewer;

presenting the viewer with an option to create a convenient access tool for later accessing information associated with a user-selected news feed post of interest to said viewer;

in response to an indication from the viewer to create the convenient access tool, creating said tool and storing same in a manner accessible to the viewer independently of the news feed.

Creating and storing the convenient access tool may comprise creating a file containing the information associated with the user-selected news feed post.

Saving the file may comprise saving the file at a location that is remote from the viewer.

The method may include presenting a file retrieval option on a personal page of said viewer within the business or social network by which the viewer can later download the file, and additionally or alternatively include a file viewing option on a personal page of said viewer within the business or social network by which the viewer can later view the file.

The information associated with the user-selected news feed post may comprise text content, image content, video content, or any combination thereof.

The information associated with the user-selected news feed post may comprise content from an electronic document that is linked to in said news feed post, for example a web page.

As an alternative to creating and storing a file, creating and storing the convenient access tool may comprise copying a hyperlink from the news feed post and storing said hyperlink in a manner accessible to the viewer independently of the news feed at a later time.

Said hyperlink may be stored in association with other contents of a personal page of the viewer within the business or social network, with the hyperlink being made available at or from said personal page.

The method may include providing access to the information associated with the user-selected news feed post via the convenient access tool after the user-selected news feed post has expired from the news feed.

The method may include creating multiple convenient access tools, each for a respective one of multiple user-selected news feed post, and providing a list of said convenient access tools to said viewer, wherein said list is sorted according to categories of the user-selected news feed posts.

Sorting the list may comprise sorting the list according to viewer-assigned categories assigned by the viewer.

The method may include presenting the viewer with the option of assigning said viewer-assigned categories after an earlier application of non-viewer-selected categories assigned to the news feed posts before displaying thereof in the news feed.

The method may include applying the viewer-assigned categories regardless of whether said viewer-assigned categories match the non-viewer-selected categories.

According to a further aspect of the invention, there is provided a method for gaining convenient repeat access in a business or social network to information associated with a news feed post, the method comprising:
  viewing a news feed containing news feed posts associated with respective subject users of the business or social network;
  selecting a news feed post of interest and selecting an option to create a convenient access tool for later accessing information associated with said news feed post of interest; and
  later accessing said tool independently of the news feed and employing said tool to viewing the information associated with said news feed post of interest outside the news feed.

According to yet another aspect of the invention, there is provided a method for categorizing, and displaying news feed content in a news feed generated within a business or social network environment, the method comprising:
  receiving news feed posts associated with respective subject users of the business or social network, each news feed post having been assigned a category
  generating a central news feed containing the received news feed posts; and
  providing viewing access to the central news feed;
  wherein each different category is associated with a different respective category indicator and each news feed post displayed to said viewer is accordingly displayed with the respective category indicator associated with the category of said news feed post.

Each category indicator may display a flag of a regional location associated with one or more of the subject users.

At least one flag may be a national flag.

The flag may be representative of the nationality of the one or more subject users.

The flag may be representative of the residence of the one or more subject users.

BRIEF DESCRIPTION OF THE DRAWINGS

The following description and drawings are illustrative and are not to be construed as limiting.

FIG. 5 is a flow diagram of a process for generating and displaying a live feed in a business or social network environment.

DETAILED DESCRIPTION

A system and method whereby the content of a live news feed is categorized by subject, by the subject user, at the time it is added to the live news feed. Each subject is associated with a color, allowing the viewing user to filter the live news feed content by visually by color or by choosing to filter the news feed by subject, making one or more categorical choices of subject areas they wish to view. Some examples of categories by subject are news releases, meeting invitations, media articles which may contain a link, a video with a written introduction, product news, business how-to advice or the like. Any subject user 101b within the Business or Social Network may contribute a variety of types of information to either their own Personal Live Newsfeed 115 or Central Live Newsfeed 110 which may include 'links' to information, photographs, videos, documents, a simple message, live links to video meetings, invitations and the like.

Each user within the business or social network automatically becomes categorized and defined based upon demographical and personal information they provide at the time they create an account or make changes to their account information. Examples of user types 407 are Language, Country, City, Position (within a company or organization) and the Like. The viewing user 101a may choose to view all posts, which will appear colorized, with each subject assigned its own color. If, for example, the viewing user would like to see all 'live meeting invitations' but prefers to view only meetings scheduled by Directors, they must make a selection from both categories. The filtered result will be a live news feed, in one or more colors, which indicates top Directors who have posted an active live meeting invitation.

The viewing user also has the option to choose one or more categories by subject type 409 and may further filter the live news feed by choosing from one or more user type 407 options. Any subject user 101b within the Business or Social Network may contribute a variety of types of information to either their own Personal Live Newsfeed 115 or a Central Live Newsfeed 110 which may include 'links' to information, photographs, videos, documents, a simple message, live links to video meetings, invitations and the like.

Figure 1:
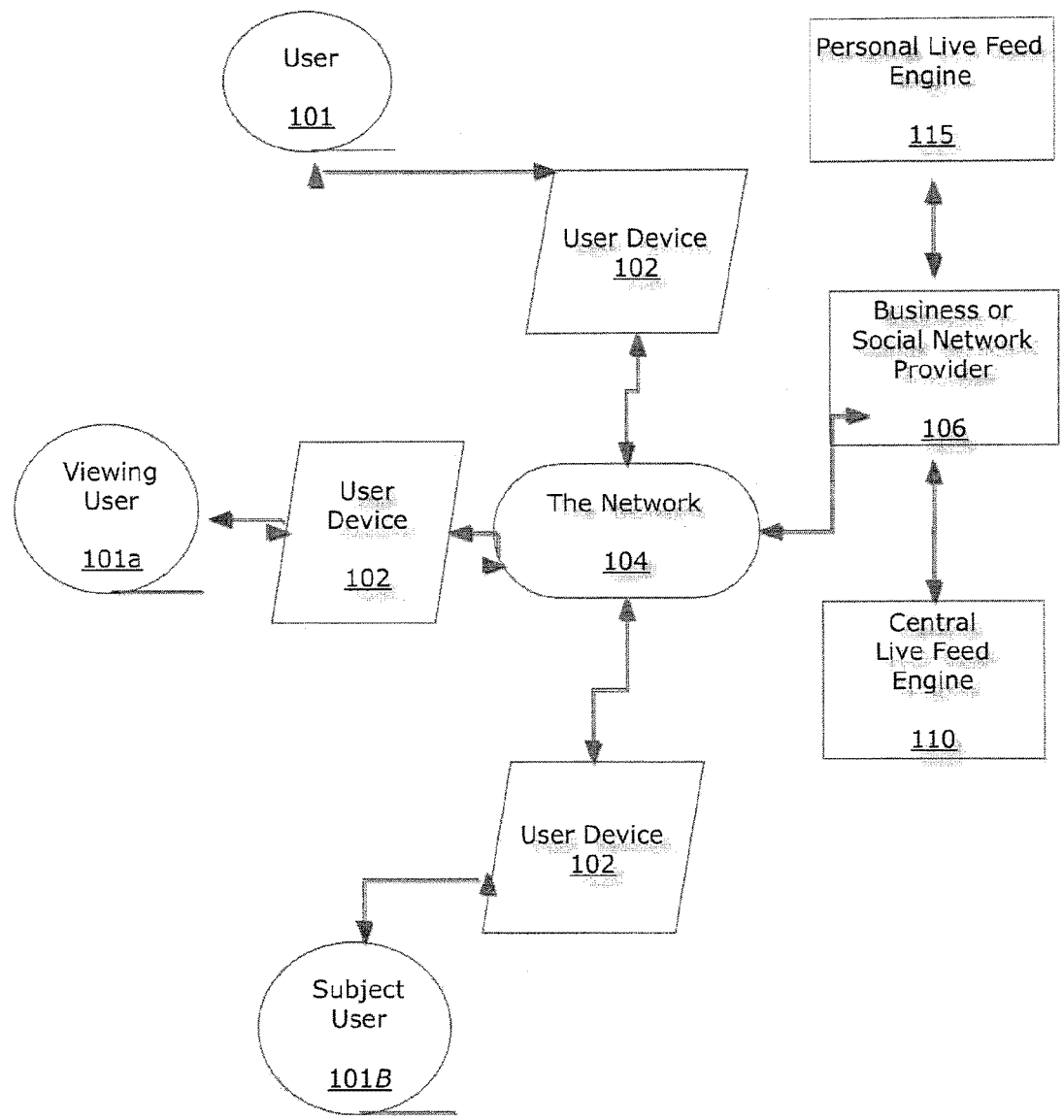
FIG. 1 illustrates an environment for generating a live feed in a business or social network environment.

FIG. 1 illustrates an environment for generating a colorized live news feed in a social or business network environment. One or more users, such as users 101 at user devices 102 are coupled to either a business or social network provider 106 via a network 104. The business or social network provider 106 may comprise any user or entity that provides business or social networking services, communication services, dating services, company intranets, and so forth. For example the business or social network provider 106 may host a website that allows one or more users 101, at one or more user devices 102, to communicate with one another via their website. The business or social networking web site/web platform offers a first user 101 an opportunity to connect or reconnect with the one or more other users 101 who for example, may work for the same company, live in the same geographical location as the first user 101, have the same language skills, have the same position within a company, etc.

In one instance, a viewing user 101a associated with a user device 102 opens the live news feed page within the business or social network provider 106 to view the central live news feed 110 which 'all' subject users 101a, 101b, etc can utilize to post information. Any user 101 in the social network may view the central live news feed page and become the viewing user 101a for purposes of reviewing the shared live feed page or become the subject user 101b, who may be the same user. Each user 101 also has access to a Personal Live feed engine 115 where they may store information of interest. Both the viewing user and subject user may save information that is within either their Personal Live News Feed or the shared central Live News Feed Page to a set of personal categorized files accessible from within their Personal or Business Page. The files are made up of the same categorical choices offered to them just prior to posting information to either a personal or central shared live news feed. All viewing users 101b have the ability to view the personal live feed 115 of all users within the social or business network however there may be information which has been blocked from view by the subject user for purposes of personal privacy. The Personal Live Feed 115 serves as a visual viewpoint of the subject user and also serves the purpose of defining the subject user in the eyes of the viewing user.

A central live feed engine 110 is coupled to the business or social network provider 106. Users create a post of information to the central live news feed engine 110. The post will also appear within the subject user's personal live news feed 115, located within their Personal or business page. For example, the subject user may want to send a message to a particular 'category' 210 of subject users 101b, such as the 'French Language' category or by making a selection of several or more subject users 101b. According to some embodiments, the viewing user 101a may be coupled directly via a user device 102 to the live feed engine 110 or the Personal Live Feed Engine. According to other embodiments, the live feed engines 115 and 110, comprises a module associated with the business or social network provider 106.

Figure 2:
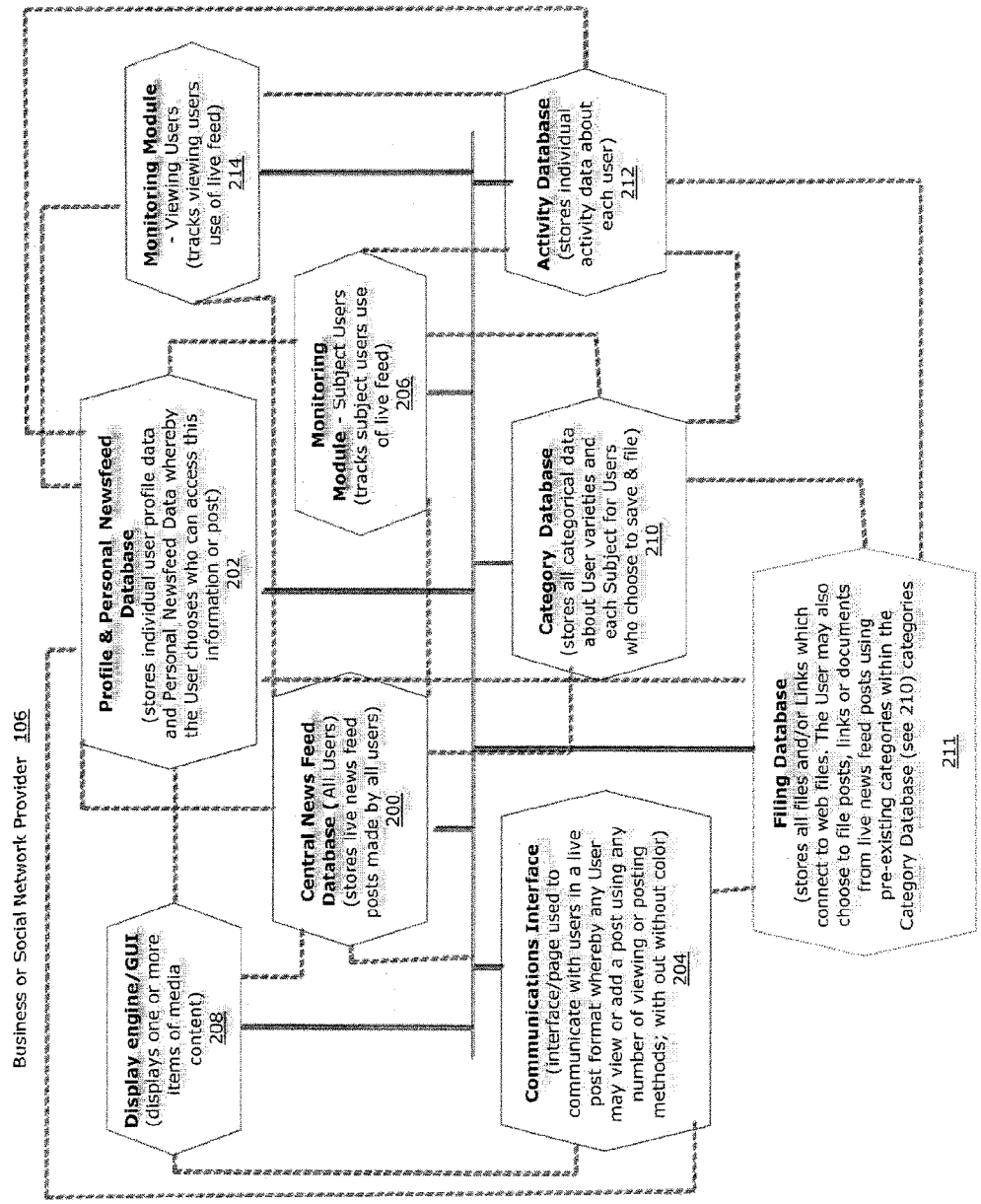
FIG. 2 is a block diagram of a business or social network provider.

Referring now to FIG. 2, a diagram of a business or social network provider, such as the to business or social network provider 106 shown in FIG. 1, is shown. A Personal or Business Live News Feed database 202 is provided for storing data associated with each user, such as the user 101 that is associated with user device 102, as an example. When a user 101 subscribes to services provided by the business or social network provider 106, a user business or personal profile will be generated for user 101. The user 101 must complete a variety of selections such as city, country, birth date, gender, first language, second language, company position, and the like, which form some the categories which become stored in the Category Database 210 and continually monitored by the Monitoring Module 206.

According to some embodiments, the user's personal or business page data is stored in the Personal Profile Newsfeed Database 202 which is created outside of the business or social network environment 200 (live news feed) and accessed by the business or social network provider 106. All users within the business or social network would have the ability to view each other's personal or business profiles within the business or social network, based upon the subject user's privacy selections. Alternatively, the Personal or Business Profile Database 202 and the Central News Feed Database 200 may be located remotely and accessed by the business or social network provider 106.

The business or social network provider 106 includes a communications interface 204 for communicating with users 101, such as via the user device 102 described herein, over the network 104. The user device 102 communicates various types of information, such as privacy settings selections, grouping of other users 101, and so forth, to the social network provider 106 via the communications interface 204. Any type of communications interface 204 is within the scope of various embodiments.

A monitoring module 206 tracks the subject user's use of the central live news feed as well as the user's Personal or Business News Feed Database 202, on the business or social networking application. For example, the monitoring module 206 can track menu selections made by each subject user as they enter information into the live news feed 406. It is at this point the user can choose file a copy of their post by subject where it will be filed chronologically by date and time, and stored in the category database 210. Posts made to the central five newsfeed will also automatically appear within each user's 101 personal live news feed chronologically by date and time. Any type of user activity is tracked or monitored via the monitoring module 206.

A display engine/GUI 208 may also be provided by the business or social network provider 106. The display engine/GUI 208 displays the one or more items of media content, profile information, and the like to users 101. User 101 can interact with the business or social network provider 106 via the display engine/GUI 208. For example, users 101 can select privacy settings, access their own user Personal or Business Newsfeed 202, access information within the Central News Feed Database 200, and send it to user 101 via the business or social network provider, and so forth, via the display engine/GUI 208. The live feed on either the Central News Feed Database 200 or the user's personal live news feed 115 may be displayed in a field within the display engine/GUI on 208.

A category database 210 is provided to store individual category data selections made by each user 101, some of which become defined when each user completes their user profile categories upon entering the business or social network to become a user. The categories, for example, may specify that the subject user 101b holds a particular position within a company, identify fluent language(s) spoken, indicate a University Graduate, member of a group, or the like.

An activity database 212 is provided for storing individual activity data about each user 101. The activities may be tracked by the monitoring module 206 and may be stored in the activity database 212. Activity entries in the activity database 210 may include a date and timestamp of the activity, a link, photos, video, the type of activity, the user 101 initiating the activity, any other users 101 who are objects of the activity, and the like. Activities may be stored in multiple databases, including the activity database, the profile database, the category database, or the like.

According to some embodiments, a user 101 within the business or social network will have answered many categorical questions upon setting up an account within the business or social network, which becomes stored in the Category Database 210. For example, if user 101 indicates his first language is English and his 2$^{nd}$ language is Spanish, the business or network provider 106 may assign those categories to user 101, which are stored in the category database 210. The user 101 may make additions to these categories unknowingly, for example by simply adding a 3$^{rd}$ language option of French. Another example of a user category is the users position/level within a company, education facility, healthcare facility etc. The user 101 may be described in more than one category along with other users 101, according to exemplary embodiments. A number of categories will exist to define each user 101 in the business is or social network environment. A timestamp or other chronological indicia may be associated with entries in the category database 210.

According to exemplary embodiments, one or more networks may be provided for each user 101. For example, user 101 may choose to work, network or be friends with a group of people comprised of people categorized or grouped to form members of a team, a network comprised of people categorized by geographical location of residence, a network comprised of people grouped according to a common education or field of expertise, or the like. Users can then refer to the categories as one of many options to search users for example.

Any type of network may be provided by the business or social network provider 106. In other words a network may be comprised of people grouped according to any type of similarity such as a language category, described herein, such as Spanish, geographical location and so forth. User 101 may specify the networks, the categories, the subcategories and so on may which may be predetermined by the social network provider 106. The networks, categories, the subcategories and so forth are meant to track and present information or data posted by various types of users or subjects (see 404), which is used to filter out unwanted data, leaving the remaining information more defined and visually categorized by color.

Although the business or social network provider 106 is described as being comprised of various components (the personal or business newsfeed database 202, the communications interface 204, the monitoring module 206 the display engine/GUI 208, and the category database 210), fewer or more components may comprise the social network provider 106 and still fall within the scope of various embodiments.

The central live feed engine 110 is configured to receive data directly from any subject user 101*b* for display to the viewing user 101*a*. Both the subject user and viewing user will have the option to share or save any post within the central live news feed to their Personal Live Feed Engine 115 or their personal category files 410. The Personal Live Feed engine 115 contains settings which provide the subject user 101*b* with the option of automatically receiving posts from the central live news feed 110 to their Personal Live Feed 115 by choosing from a variety of subject categories or by randomly selecting posts to share with their Personal Live Feed 115 and fellow associates and the like.

Figure 3:
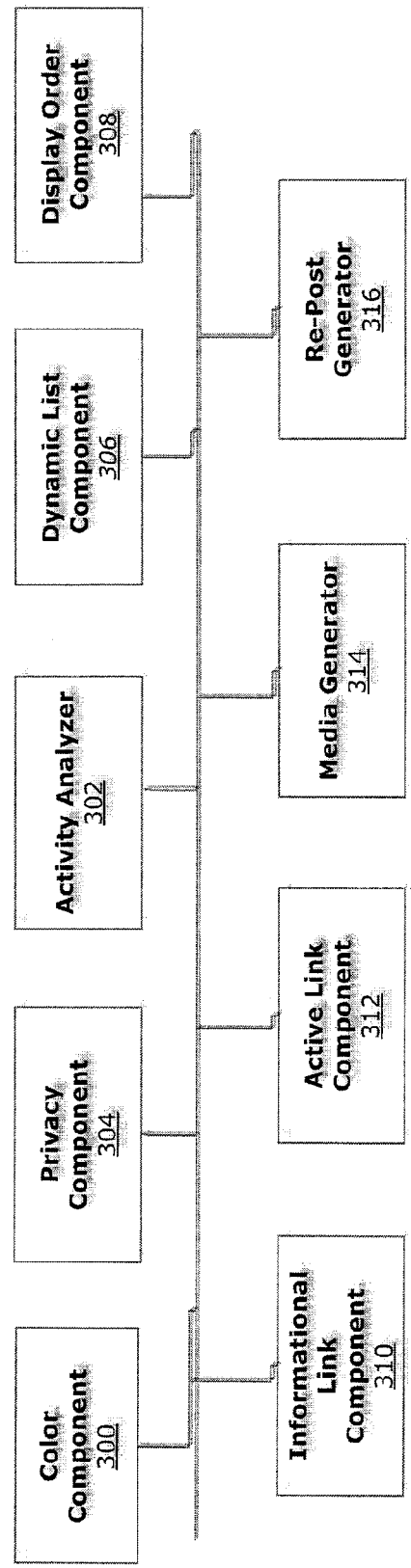
FIG. 3 is a block diagram of a central live feed engine.

FIG. 3 is a block diagram of an exemplary embodiment of the central live feed engine 110. The central live feed engine 110 includes an activity analyzer 302, a privacy component 304 and a dynamic list component 306, for determining the activities regarding the subject user 101*b* that may be displayed as news items. The central live feed engine 110 further includes a display order component 308, an informational link component 310, an active link component 312, a color component 300 and a media generator 314, for displaying the news items to the viewing user 101*a*.

The activity analyzer 302 accesses the one or more user activities detected by the monitoring module 206 and analyzes the one or more user activities to duplicate the activities of the subject user 101*b* and the viewing user 101*a*. Activities such as the sharing of a subject user's central live news feed posts, commenting on a subject user's live news feed post, or the like, will appear in duplicate on the subject user's Personal Live News Feed. Optionally the activity analyzer 302 may access the one or more activities from the various data bases (e.g., the profile database 202, the category database 210, the activity database 212, and the like). Examples of activities performed by the subject user 101*b* are posts made to the central live news feed as well as sharing options they may have chosen for the post, comments on another subject user's post, tracking the comments added to each post to the central live news feed which determines the posts which have the most user interest, RSVP to an event, add a comment to a live feed post, saving a link to a personal file in the Personal Business Page, add a photo to the live news feed, add a video link to the live news feed, create an event, manually add a link, and the like. The activities may include functions performed by other users 101 relating to the subject user 101*b* (e.g., a compliment of user 101*a* to the subject user's 101*b* post, within the Live News Feed page, the subject user 101*b* receives a promotion and moves up one level in his company, the subject user receives a variety of compliments from other users 101 on the company announcement, and the like). The activities may also include activities outside the social network, e.g., sharing a link from the central Live News Feed with your Facebook and Twitter accounts are associated with the Personal Live Feed engine 110 and/or the social network provider 106.

The privacy component 304 is configured to analyze the privacy settings of the subject user 101*b* and it works to limit the what the viewing user can see within the subject user's Personal Business Page and Personal News Feed that the subject user 101*b* has elected to not display.

The dynamic list component 306 is configured to limit the number of live news feed items/posts displayed within the central Live News Feed or the Personal Business live news feed, according to the timestamp, for display as news items.

The display order component 308 is configured to determine an order for the display of the news feed items. In some embodiments, the list of news items may be sorted according to a timestamp. News feed items the subject user has chosen to be re-posted at a later time or later date are configured and formatted by the Re-Post Generator 316. In other embodiments, the list of news items may be sorted according to the viewing user's categorical choices, if any were made (e.g viewing user's subject category preferences, posts which request feedback, notice of webinar meetings, and the like), and the subject user priority (e.g., a date and time are applied automatically, and the like).

The informational link component 310 is configured where one or more informational links may provide the viewing user 101*a* additional information about the subject of the news items. For example, a subject user may type a message into the Live News Feed and attach an informational link to connect the viewing user 101*a* to a website which displays an article containing more detailed information on the subject, and the like.

The active link component 312 is configured to provide the viewing user 101*a* one or more active links to an activity of the subject user 101*b*. The active links may enable the viewing user 101*a* to participate in the activity that is the subject of the news item. For example, an active link may enable the viewing user 101a to join a meeting that the subject user 101b has posted within the live news feed. In various embodiments, an active link may enable the viewing user 101a to indicate their attendance, file or save the invitation or simply copy it to their Personal Live News Feed from the Central News Feed.

The media generator 314 is configured to operate to format the activity list compiled by the activity analyzer 302 and displays the subject user's Personal live news feed posts based upon the privacy choices the subject user has chosen which become limited by the privacy component 304, the dynamic list component 306 and the display order component 308. Information posted to the live news feed also has the option to be re-posted at a later date through the re-post generator 316, which sends live news feed items back to the activity analyzer 302. The media generator 314 is further configured to provide functionality to any links attached by the informational link component 310 and/or the active link component 312. In some embodiments, the media generator component 310 provides the display of the news items to the display engine/GUI 208 for display to the viewing users 101a. Alternatively, the media generator 314 displays the live feed news items to the viewing user 101a via the user device 102.

Figure 3A:
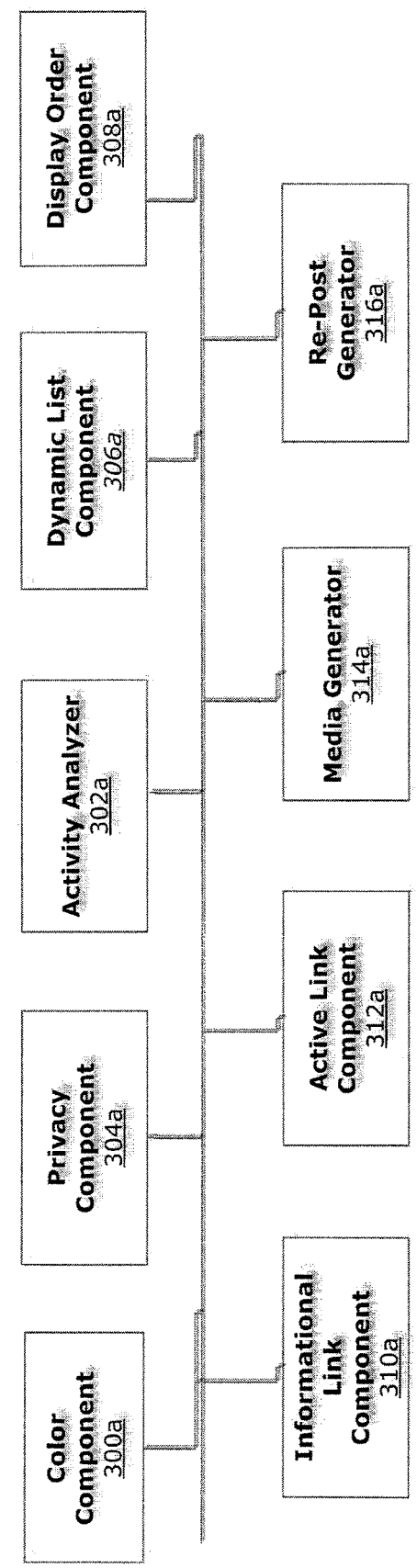
FIG. 3a is a block diagram of a personal live feed engine.

Although both the Personal Live Feed Engine 115 (FIG. 3a) and the Central Live Feed Engine 110 (FIG. 3) are described as being comprised of various components (e.g., the color component 300, the activity analyzer 302, the privacy component 304, the dynamic list component 306, the display order component 308, the informational link component 310, the active link component 312, the media generator 314 and the re-post generator 316), fewer or more components may comprise the Personal Live Feed Engine 115 and Central Live Feed Engine 110, and still fall within the scope of various embodiments.

Figure 4:
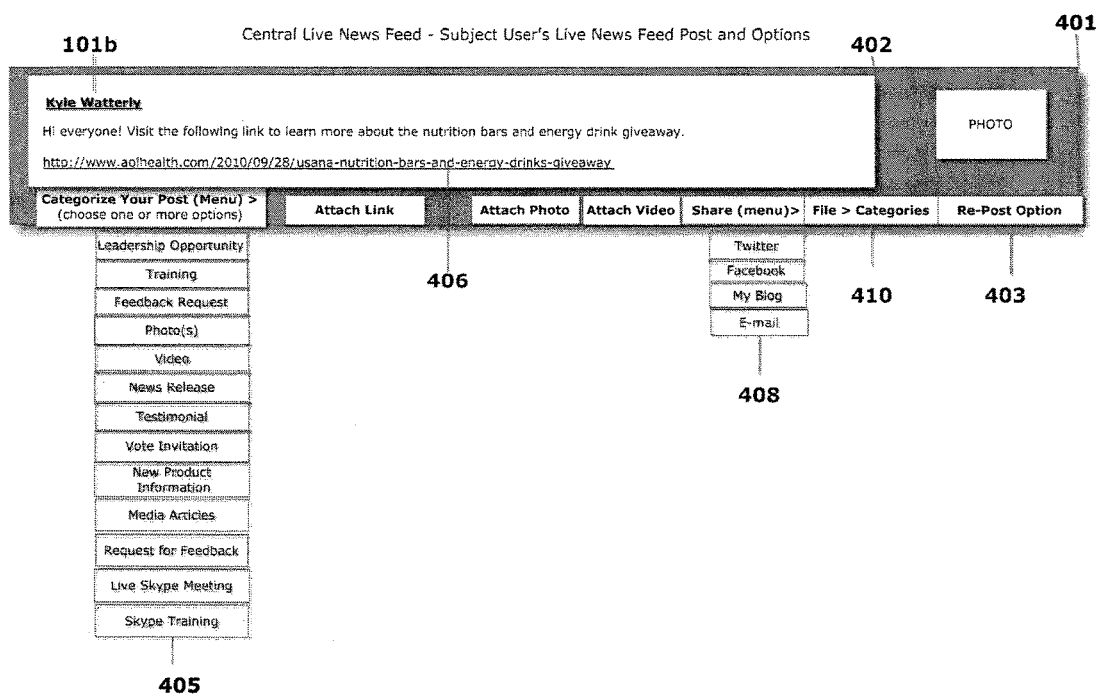
FIG. 4 is a screen shot of one news item displayed to the subject user and the categories which the subject user may choose from prior to posting/sharing information within the central live newsfeed.

FIG. 4 is an exemplary screen view of options available to the subject user 101b while posting information to the Central Live News Feed 110. If the subject user 101b wishes to re-post the same information again within the Central Live News Feed, but at a later time, the Re-Post 403 option makes it possible to re-distribute the same post at a later time and date based on a time and date, or length of delay before the re-post, selected or inputted by the subject user.

Before a post can be shared, the subject user 101b is required to apply one or more subject categories 405 to the information being posted, as part of the filtering process. When the viewing user 101a chooses a viewing category 404, the categories act as filters and are stored within the category database 210. User Type 409 categories are already defined by each user's personal information which identifies them by language, level or position within the company, country, city and the like, within a business or social network subject user 101b is defined within Categories. It is also stored in the category database 210. Informational links 406 are displayed within the text box 402 (see FIG. 4a) and may be attached to one or more informational posts/news items and they may contain additional information about the news item or the link, which may take the viewing user to a photo album, to view a user's documents, to videos or the like. Both the subject user and viewing user may choose to share a live news feed post with another business or social network, outside of their network, by choosing from the sharing options 408 drop down menu. Subject users 101b may also choose Share Option 408 to share information from the central live newsfeed and it is this sharing activity which is then stored in the activity analyzer 302a, then organized within the dynamic list component 306a before it becomes duplicated to appear within the subject user's Personal Live News Feed 115, as an activity.

In some embodiments, an active link 406 may be attached to one or more of the news items 402 within the business or social network, as it may be shared by one or more users. The viewing user 101a has the option to share 408 any Live News Feed Post made by subject user 101b, whether the post is within the Central Live News Feed or any Personal Live News Feed, within the Business or Social Network or outside of it.

Figure 4A:
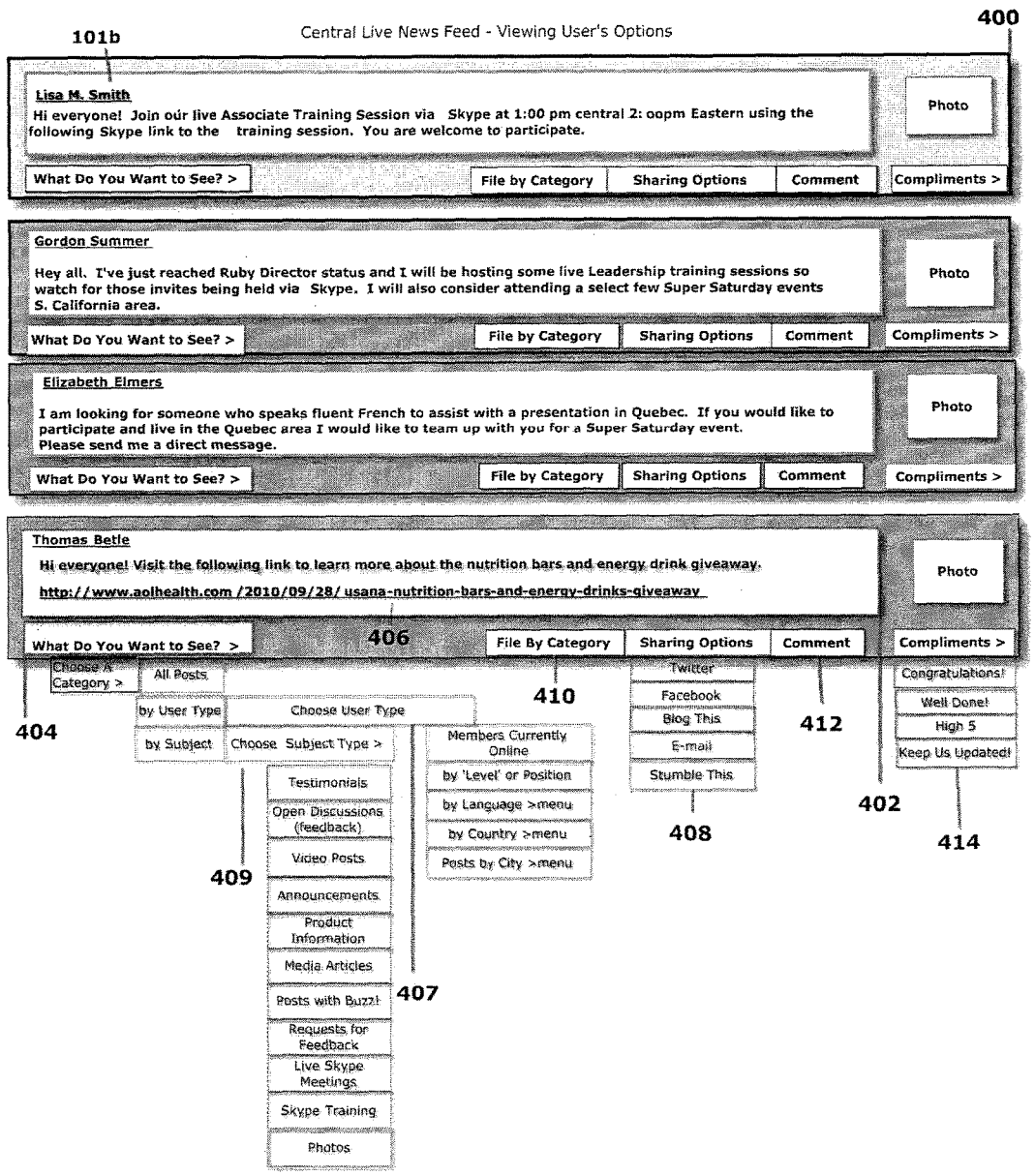
FIG. 4a is a screen shot of one or more news items displayed to the viewing user, along with drop down menus of options to filter the live news feed's content based upon whether the viewing user wishes to view 'all' posts within the live news feed or filter it further by choosing from predetermined categorical options by subject or user type. The drop down menu in FIG. 4a also allows the viewing user the options to share or file information within the live news feed.

FIG. 4a is an exemplary screen view of the viewing user's view of the Central Live News Feed, its content and its options. Step 400 indicates a live news feed post, created by a subject user 101b. The viewing user has the option to view the Central Live Feed in its entirety or they may filter out information posts by choosing categories 404 by user type 407 and by subject type 409. What remains is a colorized live news feed FIG. 4a which displays itself in a variety of colors, each color representing a subject type 409, and therefore may be visually and categorically filtered by the viewing user. A search by user type 407 will display a colorful live news feed filled with a variety of subjects, but pertaining to one or more user types. If, for example, subject categories such as Live Skype Meeting and Products are chosen along with User types such as French language and Quebec City are selected, the live news feed would display in two subject colors and will have filtered out posts which are not in the French Language and Live Skype Meetings which originate from Quebec City. In another embodiment, the color associated with each post in the news feed may correspond to the user-type of the subject user who generated the post instead of corresponding to the subject category of that post. In the illustrated embodiment, each post is labeled with the corresponding subject category color by presenting black text in a white box positioned over a colored background box filled with the respective subject category color. In other embodiments, the subject category color may be associated with the post by other methods, for example by displaying the actual text of the post in that respective color, or by displaying the text directly over a background of that color.

Still referring to FIG. 4a, the viewing user may choose to provide an opinion on the information posted by choosing a compliment from the compliments menu 414. A written comment may also be posted by the viewing user on the posted information by choosing the comment button 412 which will then open a text box 402.

Figure 6:
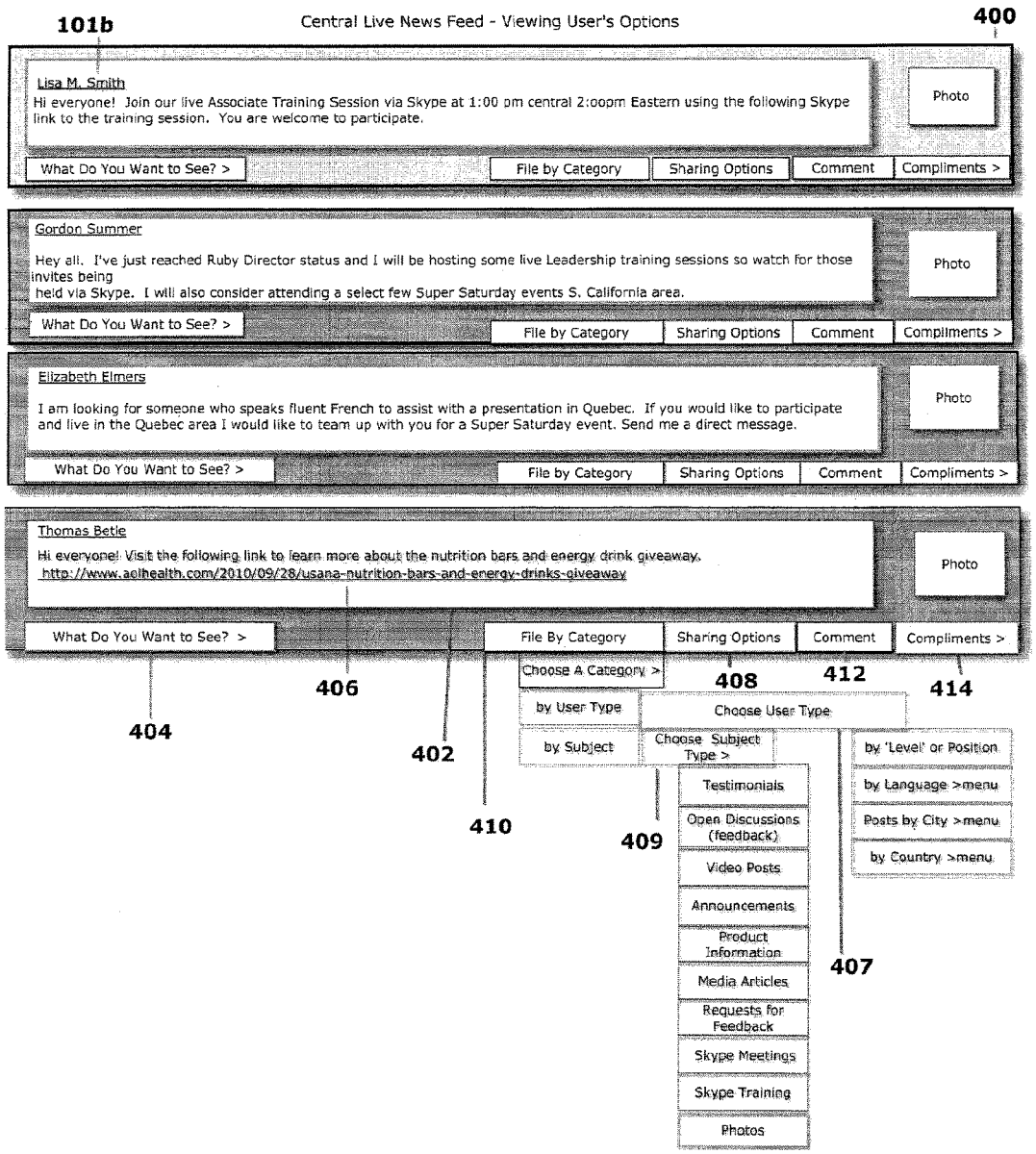
FIG. 6 is a screen shot similar to FIG. 4a, but showing the contents of a 'file' menu by which the viewing user can select to file/save contents of the post or related information linked thereto.

If the viewing user would like to save a post, they can choose to file by category 410. A variety of the same categories used to categorize posts will appear within a drop down menu and by choosing a category the viewing user will automatically file the information to their Personal Business Page, within the chosen categorical file. The 'file' menu shown in FIG. 6 illustrates examples of possible selectable categories that can be assigned by the viewing user when choosing to save or file a copy of the post. This 'filing' or storage option provides a tool by which the viewing user can save a copy of the post content for later revisit in order to review the posted information again or in greater detail. The stored information provides a tool by which the user can conveniently later re-access the subject matter of an expired post no longer visible in the news feed, or revisit the subject matter of the post before it has expired, but without having to browse, sort or filter through the news feed to find it.

Giving the viewing user the ability to assign their own category information for the content of the post, independent of any category previously assigned in the original posting in the news feed, allows the viewing user's to personalize the categorization of their saved posts.

The system may be configured to copy the text content of the post into an electronic document. The electronic document may be saved in a file database 211 administered by the business or social network, whether as part of the category database 210 or separate therefrom as shown with solid and broken lines respective in FIG. 2, with the individual's personal or business page having a option for viewing a listing of that user's files that have been stored in the database. In another embodiment, during the process of choosing to file or save a post, the user may be presented with the additional or alternative option of downloading the resulting file to local storage. The listing of stored user file's on the user's personal or business page is preferably sorted according to the categories selected by the user during the filing process, thereby making it easier to find a particular post among a file listing of significant length. During the filing process, the viewing user may also be presented with the option of naming the file, or adding a note or comment that will be displayed with the file in the list, in order to further ease the process of later selecting the file from among a list of multiple files.

Where a post contains a link to a downloadable image file, video file, or document (e.g. word processing document, spreadsheet document, html page, etc), the file option may present the ability to storing the downloadable file in addition to, or instead of, an electronic document containing the text matter of the news feed post. Where multiple file formats are used to store the full contents and/or linked information associated with a post, the multiple files for that post may be listed in the file access list of the user's personal or business page, or a single listing for that post may be operable to retrieve or view all the associated files.

Upon selection of a file from the list of stored files on or accessible from the user's personal or business page, the content of the stored file may be pulled up for display within the web browser, either as part of or separate from the personal or business page displayed therein, or pulled up for viewing in a separate program, which may depend in part on the file format in question. The file listing feature may alternatively or additional provide for download of the stored file to a local storage device at the current location of the viewing user.

In addition to allowing later access to a newsfeed post that may have expired, and thus no longer be viewable in the news feed, or that may be time consuming to try and find within the news feed if still active, the automated file saving option also provides a more convenient solution to the prior art methods of saving news feed content, which involved one or more of manually copying text and/or image content from a post and pasting and saving the same in an electronic document separate from the web browser, 'right clicking' a hyperlink to a downloadable file to save a copy of the file, and manually following a hyperlink from within a post to copy or download material from the hyperlink destination.

A hyperlink or URL within a post may be copied along with other text matter of the post into the stored file, thus allowing the user to later access the hyperlink or URL and visit the linked website or download the linked document or file via the hyperlink. In another embodiment, the filing option may be arranged to only function on news feed posts containing hyperlinks, and may simply store the hyperlinks rather than creating one or more files with the post-content and/or the image/video/text/etc. of the hyperlink destination. The hyperlinks may be listed by category in a manner displayed on or accessible from the user's personal or business page, much as described above for the file storing embodiments.

FIG. 5, a flow diagram of an exemplary process for generating and displaying a central live news feed of information, is shown. Some examples of information which can be shared and posted within the central Live News Feed are events, meetings, video, photos, links and the like. At step 500 the subject user may choose to type a message into the text box. At step 502, the subject user 101b must categorize their post of information by subject. Each subject user or 'user type' who contributes information to the Live News Feed automatically becomes categorized themselves based upon selections they will have made upon signing up to become a member. Generally speaking, the User Type categories are based upon, but not limited to, age, level or position within a company, gender, languages spoken or the like. User Type categories are stored in the Category Database.

At step 504, an active information link which connects two components within the business or social network, may be attached to one or more items within the content of either a Central Live News Feed post 200 or a Personal Live News Feed 202 post. For example, the active link component 312 may attach an active link to the news item and an active link will be formed when any two or more users 101 are mentioned in the post. This enables the viewing user 101a the ability to know which users within the business or social network may be associated with the information by way of the activities associated with the information link 504 or photograph/video link 506 or the like, viewable by holding the cursor over the link where a list of users 101 who have used the link will be displayed.

Subject users may choose Sharing Options 508 for each post made to either their Personal Live News Feed 115 or the Central Live News Feed 110 at any point after step 502.

Such sharing options are shown in FIG. 4 during creation of a Subject User's post, and may include options for sharing the information being posted through external networks or means (Twitter, Facebook, blogs, email) and sharing through the social or business network via avenues other than news feed for which the post is being generated.

At step 510, an order is assigned to the news items. For example, the display order component 308 may sort the news items according to chronological order at step 510. In various embodiments, the display order component 308 may assign the order of the news items according to categories 502 chosen by the viewing user which are stored in the Category Database 210 and the display order component 308 may apply multiple field sorts to the news items display based upon chronological order by time and date, then by chosen category. For example, the viewing user 101a may configure their preferences to display one or more categories 404 either by subject type or user type, or a combination of both, to achieve a more specific live news feed result. The order of display will also take into consideration the date/time of the live news feed post was added to the live news feed, and will then vary according to the viewing users chosen settings based upon the subject they are seeking and the user they are interested in.

At step 511, the subject user 101b has the option to re-post 403 information being posted to the live news feed where it will automatically appear in the central live news feed 110 at a later date by choosing from a series of options, for example one day, 3 days, 1 week and the like. The subject user may also re-post from the personal live feed 115 at any point and choose a timeframe where the post may reappear in the central live news feed 110.

At step 512, the news items are displayed to viewing users 101a through the central live news feed as indicated in FIG. 4a, the re-post option 511 may format the activity list compiled in step 512 and display one or more news items according to limits imposed on the scope of the viewers at step 508, the display order assigned at step 510 and the re-post option assigned at step 511. Displaying the news items at step 512 further includes displaying links attached to the news items at step 504 and/or 506. For example, links attached by the informational link component 310 and/or the active link component 312 may also be displayed by the media generator 312. The activities analyzer 302 and the monitoring module 206 track the responses made by viewing users who may choose to respond by choosing a compliment 414 or comment 412 (see FIG. 4a). Both the viewing user and subject user may choose sharing options 408 if they wish to share any information posted to the Live News Feed, at any time. The news items may be displayed by the display engine/GUI 208.

The above embodiments provide methods and systems for categorizing, colorizing, saving and visually filtering the view of the content, as well as the appearance, of a live news feed, within a business or social network. The method can involve categorizing information, photos, video and the like, prior to posting it within the live news feed. Each category is associated with a color so that it becomes visually distinctive. The live news feed can be viewed in its entirety, by user type, by subject category or a combination of categories. Category options include, but are not limited to, viewing live news feed posts by all users, posts by subject or by user type. Some examples of subject categories are products, feedback required, videos, video meeting invitations, media articles, leadership opportunities and the like. Some examples of user type categories are language, geographical location, position/level within the company etc. The viewing user may choose categories which enables them to limit information which appears in the live news feed by subject and by user type, which provides them with more specific information however they also have the option of viewing 'all' content of the live news feed. When 'all' content within the live news feed is displayed, the viewing user can visually filter out information, not missing live news feed content that they may find relevant. Both the viewing user and the subject user may file any information posted to the Central Live News feed to their Personal Business Page by choosing from a variety of categories by subject that are also used to filter the live news feed with the business or social network.

Although the process for generating and displaying a news feed is described as being comprised of various steps (e.g., type text into the text box 500, choose a subject category 502, attaching informational links 504, attach photos or videos 506, choose share options 508, assigning an order 510, choose to re-post a news feed item 511, displaying news items 512, choose to file a news feed item 513), fewer or more steps may comprise the process and still fall within the scope of various embodiments.

Several embodiments are specifically illustrated and/or described herein. However, it will be appreciated that modifications and variations are covered by the above teachings and within the scope of the appended claims without departing from the spirit and intended scope thereof. The live news feed posts may be filtered by subject type and/or user type. Once the categorical filters are applied to the live news feed, content about subjects in which the viewing user is not interested will be filtered out and a colorized live news feed of categories remains. The viewing user 101 may have the ability to choose to shut off the Color Component 300 at any point in time if it is preferred to view the chosen categories in black and white. Any of the elements associated with the live news feed may employ any of the desired functionality set forth hereinabove. Items selected for deletion from the live news feed display list may be determined according to first in first out. Method steps described herein may be performed in alternative orders. Various embodiments of the invention include logic stored on computer readable media, the logic configured to perform methods of the invention. The examples provided herein are exemplary and are not meant to be exclusive.

It will be appreciated that the above teachings concerning colorized categorization of news feed posts and filing or saving of posted or linked content from such posts may be employed regardless of whether the news feed is a public news feed available for viewing by any member of the public without needing to register with or log into the system, or is a limited-access central or personal news feed only accessible to registered members of the social or business network. For example, a business or social network with one or more news feeds fed by enrolled members may have a public news feed where the posts from the registered members can be viewed by the general public. The public news feed may be colorized by subject category and may even provide filtering tools for use by the non-registered public viewers, and may include filing or saving functionality to allow the user to download a file of post-related information for their own personal use without becoming a registered member of the network. Other embodiments including a public news feed may instead limit availability of any filtering or filing/saving tools only to its registered members.

Visual markers or indictors other than use of particular colors associated with post categories are also contemplated. For example, an alternate embodiment may use the national flag of a user's residence or citizenship as a user-type category marker to be displayed with each news feed post associated with said user.

In one embodiment, as the Subject User creates each live news feed post they may apply and associate each post with more than one subject category. If the Viewing User chooses to view the live news feed by Subject, for the example, the colors in which all posts are initially displayed will be based upon Subject types, however if more than one subject type applies such as a post containing 'Photos' (lets say photos are a red post) about company 'Products' (which may be a green post), the primary category of importance chosen by the company & Developer involved in administration and development of a particular network may be that of 'Products', which will have this post appear in the color associated with 'Products' which is Green.

Alternatively, if the Viewing User were to be searching the Central Live Feed for photos, then posts containing photos will appear but if they are considered of secondary importance as a subject by the Developer, the posts may still appear in colors associated with a predetermined groups of Subject categories of greater importance but the Live News Feed posts displayed will be only that of posts which contain photo attachments or photos and the like.

User categories are may be automatically applied to each post based upon the User type attributes of who created the post and they may be associated with colors or symbols associated with the various levels within a company as an example, which are easily identifiable by the Viewing User.

If the viewing user were to search for posts by users who were at one particular level within the company, then just live news feed posts made by those users will be displayed for the Viewing user.

The embodiments discussed herein are illustrative of the present invention. As these embodiments of the present invention are described with reference to illustrations, various modifications or adaptations of the methods and or specific structures described may become apparent to those skilled in the art. All such modifications, adaptations or variations that rely upon the teachings of the present invention, and through which these teachings have advanced the art, are considered to be within the spirit and scope of the present invention. Hence these descriptions and drawings should not be considered in a limiting sense, as it is understood that the present invention is in no way limited to only the embodiments illustrated.

The invention claimed is:

1. A method for categorizing, and displaying colorized news feed content in a news feed generated within a business or social network environment, the method comprising:
   receiving categorized news feed posts from respective subject users of the business or social network, said categorized news feed posts each including a respective user-dependent category assigned thereto by, or based on a specific user-type of, the respective subject user, wherein the respective subject user is categorized based on information provided at the time the subject user creates an account with the newsfeed system such that a user of the newsfeed may sort newsfeeds based on the categorical aspects of the subject user;
   generating a central news feed containing the received news feed posts;
   providing viewing access to the central news feed;
   receiving central news feed viewing preferences from viewers of the central news feed; and
   based on said news feed viewing preferences of each viewer, determining which of the news feed posts of said central news feed should be displayed to said viewer based on the user-dependent category associated with each news feed post; and
   displaying to said viewer only the news feed posts of said central news feed that were not filtered out based on the viewing preferences of said viewer, wherein each and every different user-dependent category is associated with a different respective color and content of each and every categorized news feed post displayed to said viewer is accordingly displayed in, or simultaneously with, the respective color associated with the user-dependent category of said categorized news feed post.

2. The method of claim 1 wherein the user-dependent category assigned to at least one news feed post is a user-type category into which the subject user was categorized based on said information provided at the time of account creation.

3. A non-transitory computer readable medium having embodied thereon a program, the program being executable by a processor for performing the method according to claim 1.

4. A method for reviewing categorized and colorized news feed content within a business or social network environment, the method comprising:
   gaining access to a business or social network having a central news feed that contains categorized news feed posts from respective subject users of the business or social network, each news feed post having been assigned a user-dependent category by, or based on a specific user-type of, the respective subject user, wherein the respective subject user is categorized based on information provided at the time the subject user creates an account with the newsfeed system such that a user of the newsfeed may sort newsfeeds based on the categorical aspects of the subject user;
   submitting central news feed viewing preferences for use in determining which of the news feed posts of said central news feed should be displayed based on the user-dependent category associated with each categorized news feed post; and
   viewing a filtered display of the central news feed that contains only categorized news feed posts of said central news feed that were not filtered out based on the viewing preferences, wherein each and every different user-dependent category is associated with a different respective color and content of each and every news feed post of the filtered display is accordingly displayed in, or simultaneously with, the respective color associated with the user-dependent category of said news feed post.

5. A method for categorizing, and displaying news feed content in a news feed generated within a business or social network environment, the method comprising:
   receiving categorized news feed posts from respective subject users of the business or social network, said categorized news feed posts each including a respective user-dependent category assigned thereto by, or based on a specific user-type of, the respective subject user, wherein the respective subject user is categorized based on information provided at the time the subject user creates an account with the newsfeed system such that a user of the newsfeed may sort newsfeeds based on the categorical aspects of the subject user;
   generating a central news feed containing the received categorized news feed posts; and
   providing viewing access to the central news feed within which at least some of categorized said news feed posts are displayed to a viewing user;
   wherein each and every different user-dependent category is associated with a different respective category indicator and content of each and every categorized news feed post displayed to said viewing user is accordingly displayed simultaneously with the respective category indicator associated with the user-dependent category of said categorized news feed post.

6. The method of claim 2 wherein the subject user is categorized by language spoken.

7. The method of claim 2 wherein the subject user is categorized by geographic location.

8. The method of claim 2 wherein the subject user is categorized by occupational position.

9. The method of claim 2 wherein the subject user is categorized by educational background.

10. The method of claim 2 wherein the subject user is categorized by area of expertise.

11. The method of claim 4 wherein the user-dependent category assigned to at least one news feed post is a user-type category into which the subject user was categorized based on said information provided at the time of account creation.

12. A non-transitory computer readable medium having embodied thereon a program, the program being executable by a processor for performing the method according to claim 4.

13. The method of claim 11 wherein the subject user is categorized by language spoken.

14. The method of claim 11 wherein the subject user is categorized by geographic location.

15. The method of claim 11 wherein the subject user is categorized by occupational position.

16. The method of claim 11 wherein the subject user is categorized by educational background.

17. The method of claim 11 wherein the subject user is categorized by area of expertise.

18. The method of claim 5 wherein the user-dependent category assigned to at least one news feed post is a user-type category into which the subject user was categorized based on said information provided at the time of account creation.

19. A non-transitory computer readable medium having embodied thereon a program, the program being executable by a processor for performing the method according to claim 5.

20. The method of claim 18 wherein the subject user is categorized by language spoken.

21. The method of claim 18 wherein the subject user is categorized by geographic location.

22. The method of claim 18 wherein the subject user is categorized by occupational position.

23. The method of claim 18 wherein the subject user is categorized by educational background.

24. The method of claim 18 wherein the subject user is categorized by area of expertise.

* * * * *